US006993212B2

(12) United States Patent
Block et al.

(10) Patent No.: US 6,993,212 B2
(45) Date of Patent: Jan. 31, 2006

(54) OPTICAL WAVEGUIDE DEVICES HAVING ADJUSTABLE WAVEGUIDE CLADDING

(75) Inventors: Bruce A. Block, Portland, OR (US); Brandon C. Barnett, Beaverton, OR (US); Paul Davids, Portland, OR (US)

(73) Assignee: Intel Corporation, Santa Clara, CA (US)

(*) Notice: Subject to any disclaimer, the term of this patent is extended or adjusted under 35 U.S.C. 154(b) by 86 days.

(21) Appl. No.: 10/658,441

(22) Filed: Sep. 8, 2003

(65) Prior Publication Data

US 2005/0054199 A1    Mar. 10, 2005

(51) Int. Cl.
*G02F 1/035* (2006.01)

(52) U.S. Cl. .............................. 385/3; 385/40; 385/88
(58) Field of Classification Search .................... 385/2, 385/8, 10, 40, 48, 101, 123, 126–129, 146, 385/3, 88, 92; 372/34, 36
See application file for complete search history.

(56) References Cited

U.S. PATENT DOCUMENTS

| | | | |
|---|---|---|---|
| 5,533,151 A * | 7/1996 | Leonard | 385/3 |
| 6,493,497 B1 * | 12/2002 | Ramdani et al. | 385/131 |
| 6,567,573 B1 * | 5/2003 | Domash et al. | 385/16 |
| 2002/0001446 A1 | 1/2002 | Arakawa | |
| 2002/0094150 A1 | 7/2002 | Lim et al. | |
| 2003/0059189 A1 | 3/2003 | Ridgway et al. | |

FOREIGN PATENT DOCUMENTS

WO    WO 03/023468    3/2003

OTHER PUBLICATIONS

Oh et al. Recent Advances in Electrooptic Polymer Modulators Incorporating Highly Nonlinear Chromophore. Sep. 2001. IEEE Journal on Selected Topics in Quantum Electronics. vol. 7, No. 5, pp. 826-827.*
Lide. CRC Handbook of Chemistry and Physics. 79$^{th}$ Edition. CRC Press. 1998. 12-144.*
D. Jäger et al.; Millimeter-Wave Photonic Devices for Optical Links: Trends and Applications; Dec. 1998; Asia-Pacific Microwave Conference.
Sang-Shin Lee, et al.; Optical Intensity Modulator Based on a Novel Electrooptic Polymer Incorporating a High $\mu\beta$ Chromophore; May 2000; IEEE Journal of Quantum Electronics, vol. 36, No. 5.
Faderl, et al., "Integration of an Electrooptic Polymer in an Integrated Optics Circuit on Silicon", *J. of Lightwave Technology*, 13(10):2020-2026, Oct. 1995.
Kulishov, et al., "Electro-Optically Reconfigurable Waveguide Superimposed Gratings", *Optics Express*, 9(10): 483-489, Nov. 2001.

* cited by examiner

*Primary Examiner*—John D. Lee
*Assistant Examiner*—Rhonda S. Peace
(74) *Attorney, Agent, or Firm*—Fish & Richardson P.C.

(57) ABSTRACT

Optical waveguide devices having adjustable waveguide cladding wherein the waveguide cladding is adjustable by using an external control or stimulus to change an optical characteristic of the waveguide cladding, e.g., the refractive index of the cladding. Such waveguide devices may be designed to have certain features that are suitable for monolithically integrated opto-electronic devices and systems.

27 Claims, 4 Drawing Sheets

US 6,993,212 B2

OPTICAL WAVEGUIDE DEVICES HAVING ADJUSTABLE WAVEGUIDE CLADDING

All rights in connection with this application are assigned to Intel Corporation.

This application relates to devices having optical waveguides, and more particularly, to integrated devices and circuits having optical waveguides fabricated on substrates such as semiconductor substrates.

Optical waveguides are optical devices for spatially confining and guiding optical signals. An optical waveguide may be formed, for example, by surrounding a high-index waveguide core with one or more low-index waveguide cladding regions, to guide the light along the waveguide core. For example, optical fiber is a waveguide with a cylindrical fiber core surrounded by cylindrical fiber cladding. Various waveguide configurations are possible.

Optical waveguides may be used in a wide range of devices and applications. For example, an integrated optical or opto-electronic device may be constructed by integrating optical waveguides and other device components on a substrate.

DETAILED DESCRIPTION

Figure 1:
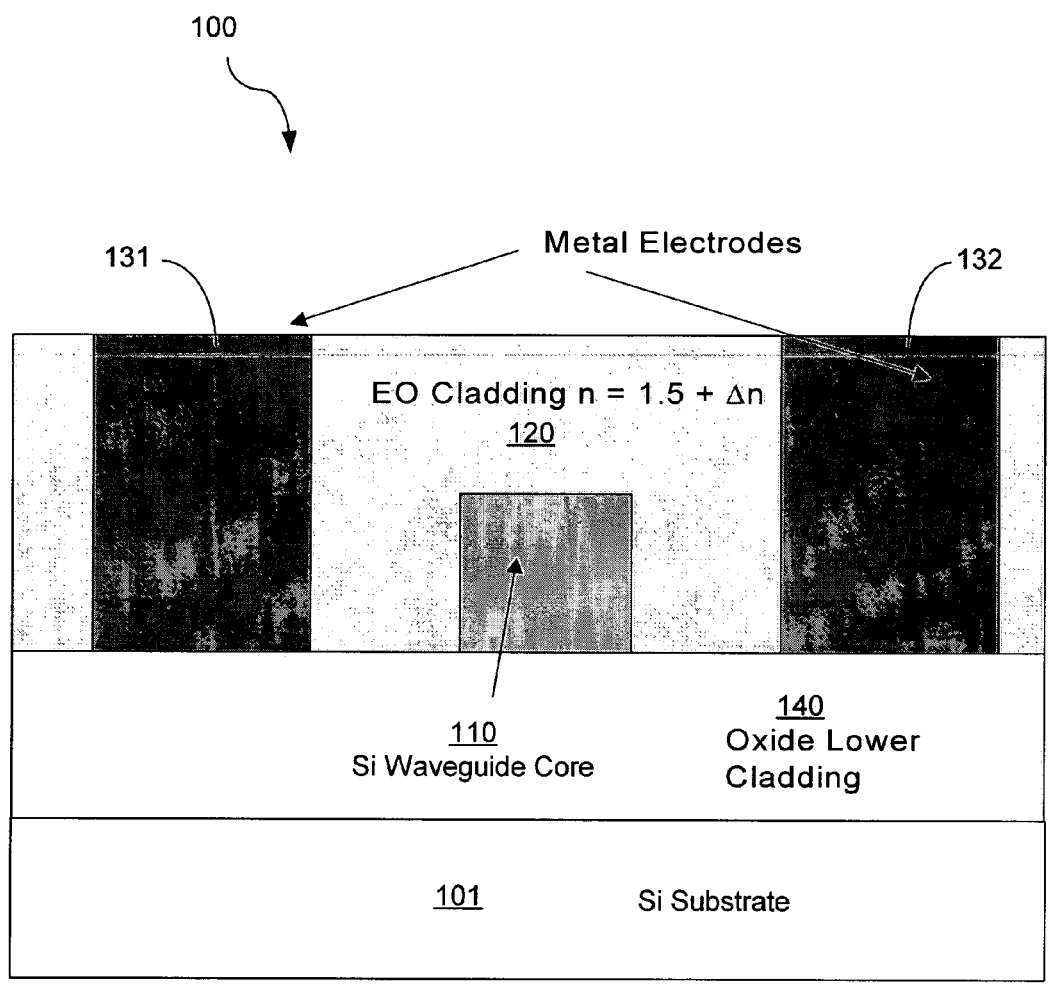
FIG. 1 shows one exemplary implementation of an electro-optic waveguide device with an electro-optic waveguide cladding.

This application includes exemplary implementations of optical waveguide devices having adjustable waveguide cladding. In general, the waveguide cladding of the optical waveguides in these implementations is adjustable by using an external control or stimulus to change an optical characteristic of the waveguide cladding, e.g., the refractive index of the cladding. This change can cause a change in the boundary conditions of the waveguide and thus lead to a change in the optical signal guided by the waveguide. Various optical devices and applications may use such waveguides to control or modulate optical signals. Such waveguides may be particularly advantageous for constructing integrated devices on substrates.

In one implementation, for example, a device may include a waveguide core and a waveguide cladding in contact with the waveguide core. The waveguide cladding has a cladding refractive index that is less than a core refractive index of the waveguide core and changes in response to a control signal. The waveguide core and the waveguide cladding form a waveguide to confine an electromagnetic wave. For this and other implementations, the waveguide cladding may be any suitable material with an adjustable refractive index in response to a control signal or stimulus. As an example, an electro-optic material may be used to form the waveguide cladding and an electrical control voltage may be applied to the cladding to adjust the cladding refractive index. Based on the specific requirements of devices and applications, materials other than the electro-optic materials may be used, such as a radiation-sensitive material whose index changes in response to illumination by an electromagnetic radiation beam and a thermal-optic material whose index changes with temperature.

In another implementation in an integrated configuration, a device may include a waveguide on a substrate. A first waveguide cladding is formed over the substrate. A waveguide core is then formed on the first cladding to have a core refractive index greater than a first refractive index of the first cladding. The device also includes a second, adjustable waveguide cladding formed on the waveguide core. The second waveguide cladding has a second refractive index that is less than the core refractive index of the waveguide core and changes in response to an electrical control signal. In addition, a pair of electrodes are formed over the substrate to apply the electrical control signal to the second waveguide cladding. This control signal controls the second refractive index of the second waveguide cladding and thereby controls the guided light.

The optical waveguides in the above and other implementations may use various waveguide configurations. One exemplary waveguide may be formed by surrounding a high-index waveguide core with one or more low-index waveguide cladding regions, to guide the light along the waveguide core. Waveguides may also be formed as a planar slab waveguide core located between two low-index planar waveguide claddings or between the air and one low-index planar substrate as the cladding. Waveguide core and waveguide cladding may be planar layers in contact with each other. In addition, channel waveguides may be used. One example of channel waveguides is a strip waveguide which is formed by placing a strip of a waveguide core on a low-index substrate or imbedded in the low-index substrate. Another example of channel waveguides is a rib or ridge waveguide where a layer of a high-index dielectric material having a strip of a rib ridge as the waveguide core is formed on a low-index substrate.

Waveguides with adjustable cladding, among other features, provide flexibility and relative ease in integrating optical waveguides on substrates, e.g., semiconductor substrates. Semiconductor materials, such as silicon (Si), GaAs, and others, generally have high refractive indices. Silicon, for example, has a refractive index around 3.5. Hence, semiconductor materials may be conveniently used as the high-index waveguide core materials. Electro-optic materials with lower index can then be used as the waveguide cladding materials to achieve a high contrast in the index between the core and the cladding.

Notably, for integrated circuits (ICs), materials used in an IC chip should be compatible with CMOS or MOS processing techniques so that the waveguide and its control circuit may be integrated on a chip with other functional circuits. Examples of such compatible electro-optic materials for a silicon waveguide core include chromaphore-doped polymeric electro-optic materials and ferroelectric materials (e.g., PZT, $LiNbO_3$, $BaTiO_3$). These and other suitable electro-optic materials generally have a low index in a range from about 1.4 to about 2.4. For example, various polymers may have an index range of about 1.4 to 1.6 and ferroelectric oxides may generally have an index from about 1.8 to 2.4. Therefore, if a semiconductor material with an index from about 3.4 to about 3.6 is used as the waveguide core, the index contrast between the core and cladding is approximately between 1 and 2. This magnitude in the index contrast is about at least one order of magnitude and may be two orders of magnitude higher than various waveguide electro-optical devices where the waveguide core is an electro-optic material.

Waveguide devices with such a high index contrast based on electro-optic cladding have a number of advantages or benefits in applications. For example, such waveguide devices are generally sensitive to a change in the refractive index of the cladding. Hence, a sufficient amount of control or modulation in the guided light can be achieved with a relatively small change in the index of the cladding. Accordingly, a desired electro-optic effect can be achieved at a low operating voltage compatible to the driving voltage of integrated circuits, e.g., a few volts or less. In addition, the high index contrast of such waveguide devices also makes it possible to reduce the dimension of the devices, e.g., to tens of microns or less. This is in part because the high index contrast keeps the light tightly confined to a smaller area than a lower index contrast waveguide system. This tight confinement allows for the electrodes to be spaced closer than with the low index contrast system. A closer spacing results in a higher electric field. Because the change in the index is proportional to the control electric field, a larger electro-optic effect can be achieved at a relatively low control voltage. Furthermore, this small dimension in turn allows the waveguide devices to operate at a high speed, e.g., about several GHz or higher.

Different from typical electro-optic waveguide devices where the waveguide core is made of an electro-optic material, the waveguide devices described here move the active electro-optic material from the core to the cladding of the waveguide to achieve a high index contrast and thus highly sensitive electro-optic effect. This allows the waveguide core material to be independent of the electro-optic capability so that CMOS compatible, small, low loss, high-index waveguides can be used. Material transitions between the waveguiding material and electro-optic material can be avoided. This feature reduces the undesired optical loss at transition interfacing regions that would otherwise be present.

For these and other reasons, one of applications of the waveguide devices with electro-optic cladding is integration of high-speed electro-optic devices with a standard CMOS silicon device to construct monolithically integrated opto-electronic devices and systems. It is desirable that these and other on-chip opto-electronic devices be very small to achieve high-speed and low drive voltage requirements.

FIG. 1 shows an exemplary implementation of an integrated waveguide device 100 where a cross sectional view is depicted. A substrate 101, such as a Si substrate, is provided as the supporting platform on which an electro-optic waveguide and its driving circuit are fabricated. Other integrated circuits such as CMOS circuits may also be formed on the substrate 101. As illustrated, a first cladding layer 140 is formed on the substrate 101 and may use an electrically insulating material, such as an oxide layer (e.g., silicon oxide) or a nitride layer (e.g., silicon nitride). A semiconductor waveguide core 110 and a second, electro-optic (EO) waveguide cladding 120 are then formed on the first cladding layer 140. The waveguide core 110 is shown to have a square or rectangular cross section. Other cross sectional shapes may also be used for the waveguide core 110. In this specific design, the waveguide core 110 is surrounded by the first and second claddings 140 and 120. The refractive index of the waveguide core 110 is higher than the indices of the claddings 140 and 120. The EO cladding 120 may have an index less than that of the core 110 by an amount greater than 1. For example, if the core 110 is silicon with an index of about 3.5 and the EO cladding 120 is a polymeric EO material with an index of about 1.5, the index contrast between the core 110 and the EO cladding 120 is about 2.

The waveguide device 100 further includes two electrodes 131 and 132 respectively located on two opposite sides of the waveguide core 110 and the EO cladding 120 to apply a control voltage to the EO cladding 120. Since the index contrast between the core 110 and the EO cladding 120 is large, the guided light is tightly confined in the core 110. Hence, the transverse dimension of the core 110 and the EO cladding 120 may be made small, e.g., about several microns or less, to have a small separation between the electrodes 131 and 132. This small separation of electrodes 131 and 132 produces a large electrical field in the EO cladding 120.

The control voltage changes the index of the EO cladding 120 to control or modulate the guided light. In operation, the control voltage may be turned on and off to control the index of the EO cladding 120. Alternatively, the amplitude of the control voltage may be varied at different voltages to control the index of the EO cladding 120. A waveguide control circuit, which may be a CMOS circuit, is fabricated on the same chip to supply the control voltage to the electrodes 131 and 132. Other circuits may also be fabricated on the same chip to operate in communication with the waveguide control circuit. The electrodes 131 and 132 may be made of metals or other electrically conducting materials.

In fabrication, the electro-optic waveguide device, its control circuit, and other circuits on the chip may be fabricated through the same fabrication process, e.g., the MOS or CMOS process. The substrate 101 may be a material other than Si that is compatible with the MOS or CMOS fabrication process.

The integrated waveguide device 100 in FIG. 1 may be used to build a variety of integrated devices and systems. The following sections describe examples of a tunable optical ring resonator, a tunable waveguide Bragg grating, and a tunable direction coupler to illustrate such applications. Other opto-electronic devices and systems are possible.

Figure 2:
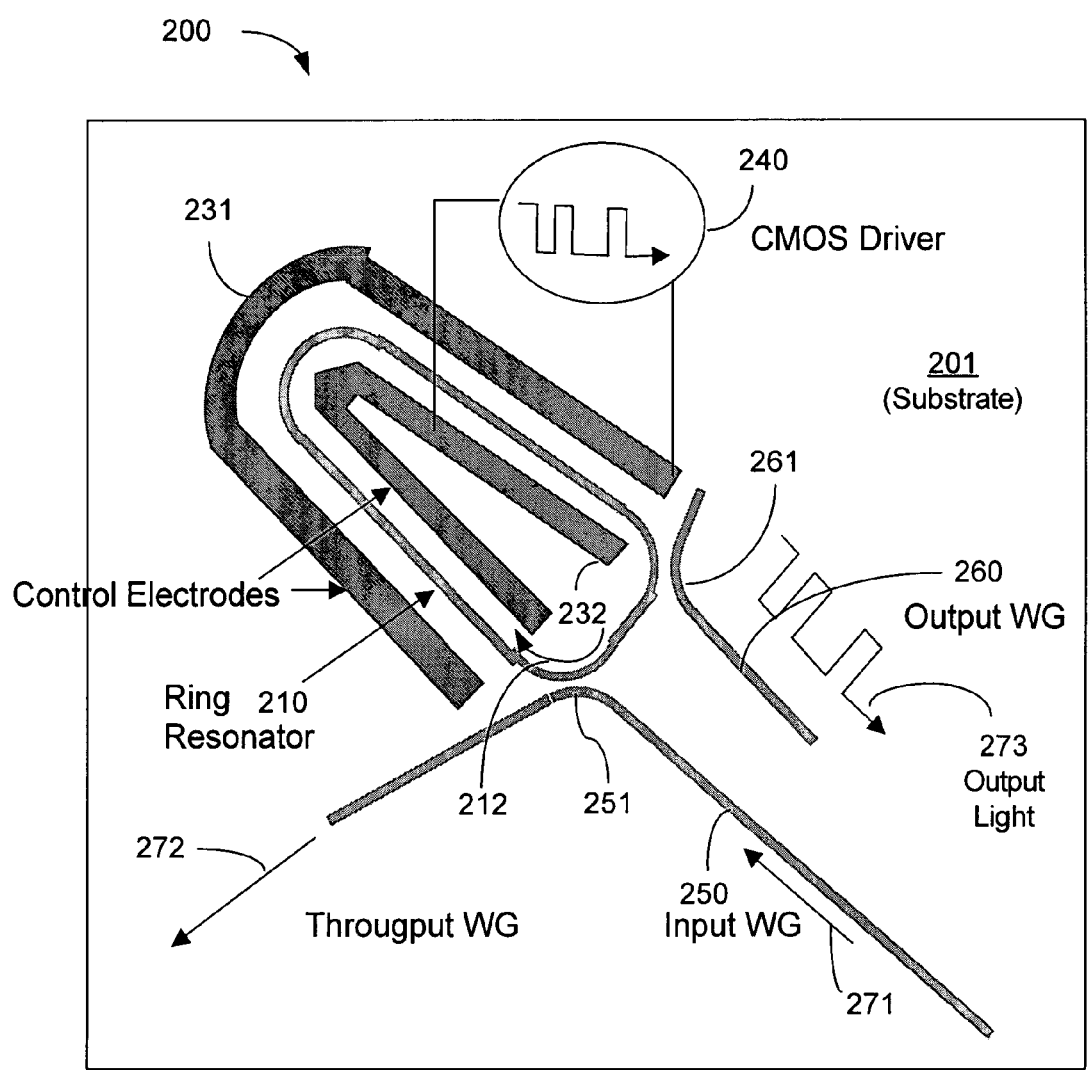
FIG. 2 shows an exemplary ring resonator modulator based on the electro-optic waveguide design in FIG. 1.

FIG. 2 illustrates an exemplary tunable optical ring resonator 200 based on the above waveguide devices with electro-optic waveguide cladding. A substrate 201, e.g., a Si substrate, is provided to build the device. A ring waveguide 210 is fabricated on the substrate 201 to have a high-index core and an EO cladding similar to the design described above with reference to FIG. 1. The EO cladding may be in the entire ring 210. Alternatively, the EO cladding may be present in a portion of the ring 210 where electrodes are present and the remaining portion of the ring has a non-EO cladding.

The ring waveguide 210 allows an optical wave to circulate therein and hence can operate as an optical ring resonator. In general, the shape of the ring 210 may be designed to meet specific requirements of the application. As illustrated, the ring 210 is elongated to accommodate for the ring resonator layout. Two electrodes 231 and 232 are fabricated and are respectively located in an area enclosed by the ring 210 and outside the ring 210. The electrodes 231 and 232 may be curved strip lines to follow the shape of the ring 210 and to supply the control voltage to the ring 210. The electrode 231 may have an opening to accommodate for optical input and output coupling with the ring 210. A CMOS driver circuit 240 may also be fabricated on the substrate 201 to supply the control voltage to the electrodes 231 and 232.

In addition to the waveguide ring 210, two waveguides 250 and 260 are also fabricated adjacent to the waveguide ring 210 on the substrate 201. The waveguide 250 has a portion 251 that is curved and placed at a selective location within the reach of an evanescent field of the guided light in the ring 210 to couple at least a portion of an input optical signal 271 into the ring 210 via evanescent coupling as the optical signal 212. The uncoupled light continues in the waveguide 250 as the throughput signal 272. The waveguide 260 is an output waveguide to carry output light from the ring 210. Similar to the input waveguide 250, the output waveguide 260 also has a portion 261 that is curved and placed at a selection location within the reach of an evanescent field of the guided light 121 in the ring 210 to couple a portion of guided light 212 out of the ring 210 via evanescent coupling as the output 273. Hence, the waveguide regions 251 and 261 are effectively evanescent optical couplers. Other suitable optical coupling mechanisms may also be used.

Notably, the ring 210 is an optical resonator and hence the light that can be coupled from the waveguide 250 into the ring 210 must satisfy the resonance condition of this resonator. Under this resonance condition, the optical path length of one round trip in the ring must be a multiplicity of the optical wavelength of the light. The input light in the waveguide 250 that does not satisfy this resonance condition passes through the coupling region 251 as the throughput signal 272 without being coupled into the ring 210. Because the optical path length in the ring 210 is a function of the effective index of the waveguide ring 210, the index of EO cladding of the can be changed to control the ring 210 to be in or out of the resonance condition. This operation can be used to modulate the light at the output waveguide 260. Therefore, the voltage modulation in the control voltage from the driver circuit 240 can be optically imprinted on the output optical signal 273 when the input signal 271 is a CW optical signal.

The above ring resonator 210 may be a micro ring resonator that addresses the specific needs for on-chip modulation. For a practical on-chip modulator to be driven by the CMOS circuitry, the modulator needs to be small. There are several reasons why it should be small. For example, small micro rings allow for multiple rings to be placed on the same chip. Also, a small size can result in small capacitance such that the RC time constant does not limit the operating speed of the device. As yet another example, the bandwidth limit of the ring resonator increases as the size decreases. This limit is due to the time for a steady state condition to be reached in the resonator. In general, a small resonator can reach a steady state faster than a large ring.

In CMOS integrated devices, the control voltage for the electro-optic cladding should be the driving voltage of the CMOS circuits (Vcc) to allow for effective on-chip integration. One of promising materials compatible with CMOS processing is polymeric (chromaphore doped) electro-optic materials. These materials have an available index range from about 1.4 to about 1.6. In some electro-optical waveguides where the core is the electro-optic material, the clad materials may at best have an index contrast of about 0.2 with respect to the index of the core material. This low index contrast can limit the bending radii permissible in a waveguide due to radiation loss caused by the bending. For example, the bending radii may be limited to several hundred microns. Hence, a high index contrast waveguide system may be used to mitigate this optical loss. In this regard, the ring resonator device in FIG. 2 uses a high index waveguide material with a low index electro-optic cladding material. A Si waveguide and other semiconductor materials may be used as the high index waveguide with electro-optic polymer cladding. These semiconductor materials have refractive indices ranging from about 3.4 to about 3.6. The index contrast of about 2 can be achieved in such waveguide devices to support WG bends much less than 20 microns in radii without significant optical loss. This advantage of the present systems is additional to other advantages addressed above.

Figure 3:
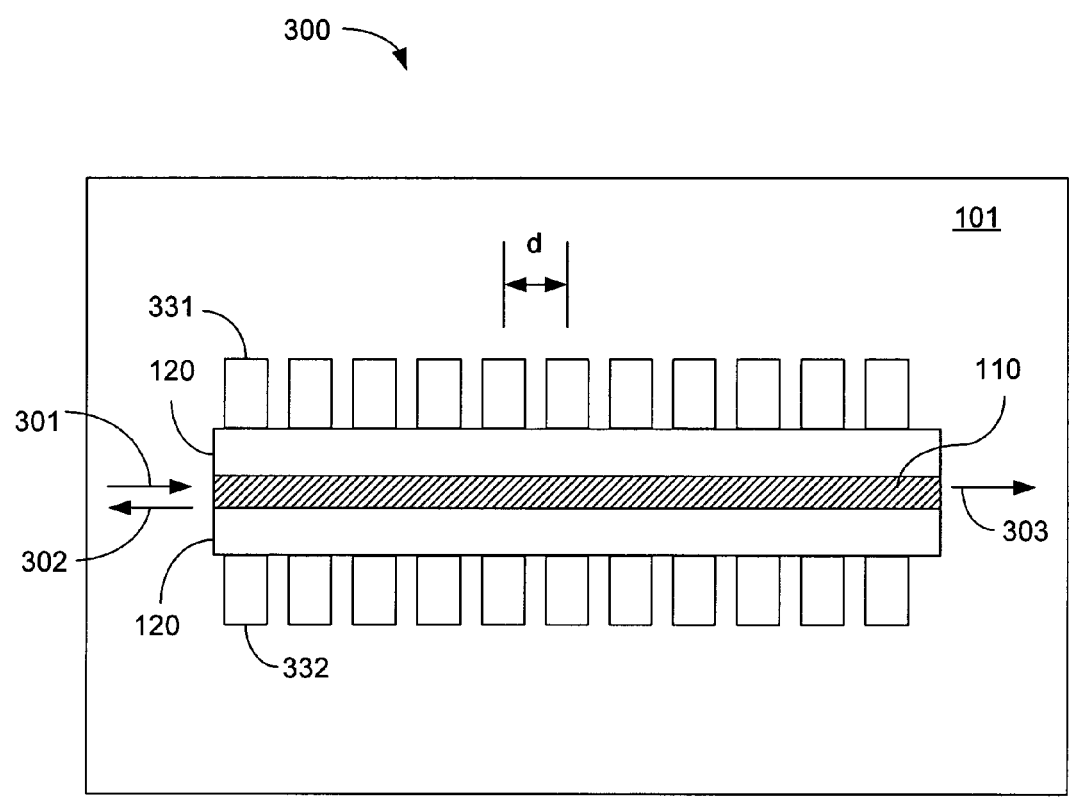
FIG. 3 shows an exemplary tunable Bragg waveguide grating based on the electro-optic waveguide design in FIG. 1.

FIG. 3 shows an exemplary tunable Bragg waveguide grating 300 based on the design of the waveguide device 100 in FIG. 1. Multiple pairs of electrodes 331 and 332 are formed along the longitudinal direction of the electro-optic waveguide which has the high-index core 110 and the low-index EO cladding 120. In the illustrated implementation, the pairs of electrodes 331 and 332 constitute a periodic pattern with a period (d) along the waveguide. When a control voltage is applied to the electrodes, the index of the EO cladding 120 is modulated periodically to form a cladding grating and thus produces a grating in the effective index ($n_{eff}$) of the waveguide.

In operation, an input optical signal 301 at a wavelength λ is reflected back as a reflected signal 302 if the Bragg condition of $2n_{eff}d=\lambda_B$ is satisfied. Other spectral components in the input optical signal 301 that do not meet the Bragg condition do not "see" the grating and hence transmit through the waveguide as a transmission signal 303. Because the resonance wavelength $\lambda_B$ is a function of the effective index $n_{eff}$ of the waveguide, the index of the cladding 120 can be electrically controlled to change the effective index $n_{eff}$ to tune the resonance wavelength $\lambda_B$. This tuning can be achieved by adjusting the amount of change in the index of the EO cladding 120. The grating period (d) may be a constant along the waveguide or spatially chirped along the waveguide.

Figure 4A:
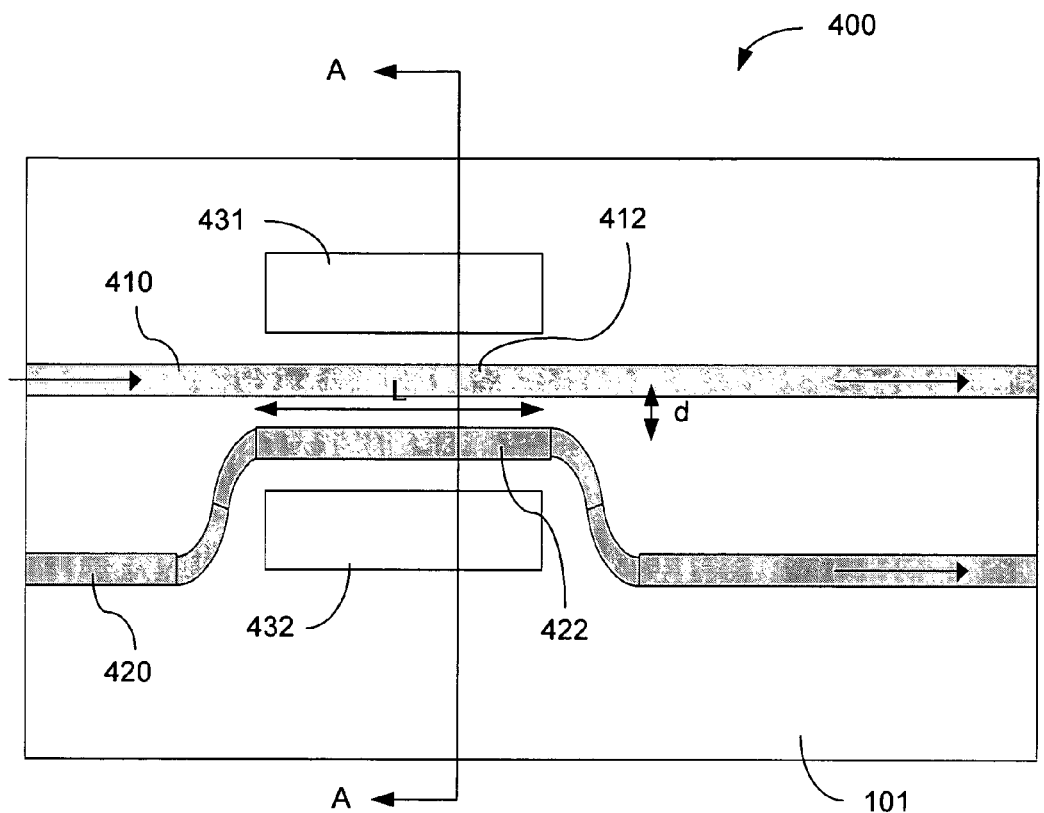
FIGS. 4A and 4B show an exemplary directional optical coupler based on the electro-optic waveguide design in FIG. 1.
Figure 4B:
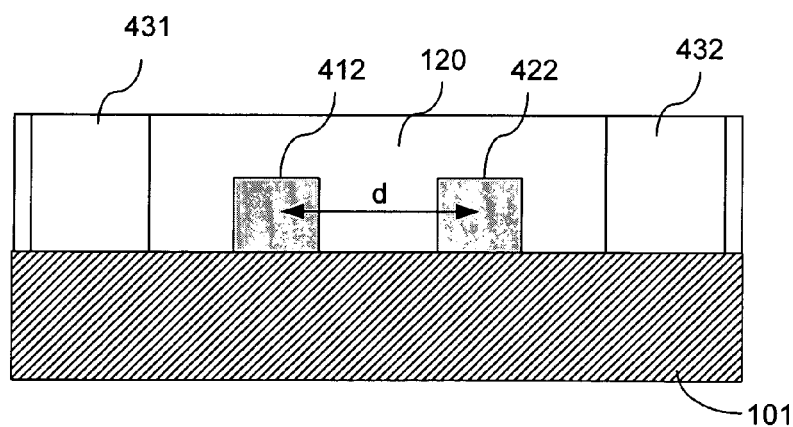

Another application of the waveguide device 100 in FIG. 1 is an electro-optic directional coupler. FIGS. 4A and 4B illustrate one example 400 of such a device, where FIG. 4B shows a cross sectional view along the line AA in FIG. 4A. On the substrate 101, two waveguide cores 410 and 420 are formed and embedded in the electro-optic cladding 120. In general, the two waveguide cores 410 and 420 are spatially separated from each other to avoid any optical coupling therebetween. Two waveguide cores 410 and 420 are designed to have sections 412 and 422, respectively, that are parallel and close to each other to allow for evanescent coupling of the guided light. In the illustrated example, the waveguide core 420 includes a bent portion as the section 422 to be close to the straight waveguide core 410. The length (L) of the sections 412 and 422 is the interaction length of the two waveguide cores 410 and 420 and the spacing between the sections 412 and 422 is d. The spacing d should be sufficiently small to allow one core to be within the reach of the evanescent filed of the guided light in another core. This evanescent coupling between the sections 412 and 422 forms the basis for the coupling between the two waveguide cores 410 and 420.

The device 400 also includes electrodes 431 and 432 on the substrate 101 that are respectively located on two opposite sides of the two waveguide cores 410 and 420. Alternatively, similar to the design in FIG. 1, an insulator layer, e.g., an oxide or nitride layer, may be directly formed on the top of the substrate 101 and then the waveguide cores 41, 420, and the cladding 120 may be fabricated on the insulator layer. A control circuit is electrically coupled to supply a control voltage to the electrodes 431 and 432 to change the index of the OE cladding 120. This change in the index of the OE cladding 120 changes the effective interaction length between the sections 412 and 422 and therefore operates to control the coupling strength between the waveguide cores 410 and 420.

In operation, the control voltage to the waveguide cladding may be set to a first value to completely couple input light at a particular wavelength in one waveguide core to the other waveguide core, and to a second value to essentially prevent any coupling between the sections 412 and 422 so that the input light in one waveguide core passes through without being coupled to the other core. Certainly, the control voltage may be set to a value between the first and the second values to allow for partial coupling and the coupling ratio can be controlled by the control voltage.

Only a few implementations are described. However, it is understood that variations and enhancements may be made.

What is claimed is:

1. A device, comprising:
    a waveguide core; and
    a waveguide cladding in contact with and shaped to enclose around said waveguide core, said waveguide cladding having a cladding refractive index that is less than a core refractive index of said waveguide core and changes in response to a control signal, wherein said waveguide core and said waveguide cladding form a waveguide to confine an electromagnetic wave and said waveguide core has a high refractive index from about 3.4 to about 3.6, and said waveguide cladding has a low refractive index from about 1.4 to about 2.4.

2. The device as in claim 1, further comprising a control unit to supply said control signal and to control said electromagnetic wave by changing said cladding refractive index.

3. The device as in claim 1, further comprising a substrate fabricated with an integrated circuit which supplies said control signal, wherein said waveguide core and said waveguide cladding are integrated on said substrate to receive said control signal.

4. The device as in claim 3, wherein said integrated circuit is a CMOS circuit, and wherein said waveguide core and said waveguide cladding are made of materials that are compatible with a CMOS fabrication process used for fabricating said CMOS circuit.

5. The device as in claim 1, wherein said waveguide core includes a semiconductor material.

6. The device as in claim 5, wherein said semiconductor material includes silicon.

7. The device as in claim 5, wherein said waveguide cladding includes an electro-optic material.

8. The device as in claim 7, wherein said electro-optic material includes a polymer.

9. The device as in claim 8, wherein said polymer is doped with chromophore.

10. The device as in claim 1, wherein said waveguide cladding includes a ferroelectric material.

11. The device as in claim 1, wherein said waveguide core is surrounded by said waveguide cladding.

12. The device as in claim 1, wherein said waveguide core and said waveguide cladding are planar layers in contact with each other.

13. The device as in claim 1, wherein said waveguide core has a strip shape and is atop said waveguide cladding.

14. The device as in claim 1, wherein said waveguide core has a strip shape that is embedded in said waveguide cladding.

15. The device as in claim 1, wherein said waveguide core and said waveguide cladding form a ridge waveguide.

16. A device, comprising:
    a substrate;
    a first waveguide cladding formed over said substrate;
    a waveguide core formed on said first cladding and having a core refractive index greater than a first refractive index of said first cladding;
    a second, adjustable waveguide cladding formed on said waveguide core and having a second refractive index that is less than said core refractive index of said waveguide core, wherein said second refractive index changes in response to an electrical control signal and said waveguide core and said second waveguide cladding have different refractive indices which differ by an amount from about 1 to about 2, and wherein the waveguide core is embedded in said second waveguide cladding to leave one side in contact with the first waveguide cladding; and
    a pair of electrodes formed over said substrate to apply said electrical control signal to said second waveguide cladding to control said second refractive index of said second waveguide cladding.

17. The device as in claim 16, wherein said substrate is a semiconductor substrate.

18. The device as in claim 17, wherein said substrate includes silicon.

19. The device as in claim 16, wherein said first waveguide cladding includes an insulating material.

20. The device as in claim 16, wherein said first waveguide cladding includes an oxide.

21. The device as in claim 16, wherein said first waveguide cladding includes a nitride.

22. The device as in claim 16, wherein said waveguide core forms a closed loop as an optical ring resonator.

23. The device as in claim 16, further comprising a plurality of pairs of electrodes along a longitudinal direction of said waveguide core in a periodic pattern operable to produce a spatial periodic index variation in said second, adjustable waveguide cladding.

24. The device as in claim 16, further comprising a second waveguide core formed between said first and said second waveguide claddings and having a core refractive index greater than the first and the second refractive indices, said second waveguide core having a waveguide portion close to a portion of said waveguide core to effectuate evanescent coupling between said waveguide core and said second waveguide core, wherein said waveguide portion and said portion are located between said pair of electrodes.

25. The device as in claim 24, further comprising a control circuit to produce said electrical control signal and operable to control optical coupling between said waveguide core and said second waveguide core.

26. A method, comprising:
    directing an optical signal into a waveguide having a high-index waveguide core and a low index waveguide cladding, wherein said waveguide cladding exhibits an electro-optic effect and encloses around said waveguide core, wherein said waveguide core and said waveguide clad cladding have different refractive indices which differ by an amount from about 1 to about 2; and
    applying an electrical control signal to said waveguide cladding to control said optical signal via said electro-optic effect.

27. The method as in claim 26, wherein the waveguide core includes a semiconductor material.

* * * * *